United States Patent
Tang

(10) Patent No.: US 11,026,194 B2
(45) Date of Patent: Jun. 1, 2021

(54) METHOD, TERMINAL, AND BASE STATION FOR USE IN DATA TRANSMISSION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 81 days.

(21) Appl. No.: 16/098,581

(22) PCT Filed: Jun. 12, 2016

(86) PCT No.: PCT/CN2016/085439
§ 371 (c)(1),
(2) Date: Nov. 2, 2018

(87) PCT Pub. No.: WO2017/214767
PCT Pub. Date: Dec. 21, 2017

(65) Prior Publication Data
US 2019/0150107 A1 May 16, 2019

(51) Int. Cl.
*H04W 56/00* (2009.01)
*H04W 72/04* (2009.01)
(Continued)

(52) U.S. Cl.
CPC .......... *H04W 56/001* (2013.01); *H04W 4/80* (2018.02); *H04W 16/02* (2013.01);
(Continued)

(58) Field of Classification Search
CPC .................................................... H04W 76/15
See application file for complete search history.

(56) References Cited

U.S. PATENT DOCUMENTS

2008/0070578 A1* 3/2008 Flore ................ H04W 56/0045
455/438
2013/0176997 A1* 7/2013 Tian ................. H04W 56/0085
370/336
(Continued)

FOREIGN PATENT DOCUMENTS

CN 102300314 A 12/2011
CN 102624480 A 8/2012
(Continued)

OTHER PUBLICATIONS

International Search Report in international application No. PCT/CN2016/085439, dated Mar. 1, 2017.
(Continued)

*Primary Examiner* — James P Duffy

(57) ABSTRACT

Disclosed are a method, a terminal, and a base station for use in data transmission. The present invention allows the terminal to receive a downlink control signaling at a low frequency band and to transmit data at a high frequency band when high-speed data transmission is required. The method comprises: when there is no data transmission, the terminal receives first indication information in a first cell using a first frequency band, the first indication information being used for indicating a terminal having received the first indication information to use a second frequency band for data transmission; the terminal transmits data in a second cell using the second frequency band on the basis of the first indication information when data transmission is required.

17 Claims, 3 Drawing Sheets

(51) Int. Cl.
*H04W 68/00* (2009.01)
*H04W 16/02* (2009.01)
*H04W 4/80* (2018.01)
*H04W 68/02* (2009.01)

(52) U.S. Cl.
CPC ......... *H04W 56/005* (2013.01); *H04W 68/00* (2013.01); *H04W 68/02* (2013.01); *H04W 72/042* (2013.01); *H04W 72/044* (2013.01); *H04W 72/0453* (2013.01)

(56) References Cited

U.S. PATENT DOCUMENTS

| | | | |
|---|---|---|---|
| 2014/0004861 A1 | 1/2014 | Choi | |
| 2014/0287753 A1* | 9/2014 | Schulist | H04W 36/0022 455/436 |
| 2015/0092630 A1* | 4/2015 | Lin | H04L 5/14 370/280 |
| 2016/0100374 A1* | 4/2016 | Choi | H04W 56/0015 370/331 |

FOREIGN PATENT DOCUMENTS

| | | |
|---|---|---|
| CN | 102905270 A | 1/2013 |
| CN | 103249049 A | 8/2013 |
| EP | 2958376 A1 | 12/2015 |
| WO | 2013147788 A1 | 10/2013 |
| WO | 2016053426 A1 | 4/2016 |

OTHER PUBLICATIONS

Written Opinion of the International Search Authority in international application No. PCT/CN2016/085439, dated Mar. 1, 2017.
Supplementary European Search Report in the European application No. 16904386.5, dated Feb. 21, 2019.
English translation of the Written Opinion of th International Search Authority in the international application No. PCT/CN2016/085439, dated Mar. 1, 2017.
First Office Action of the Japanese application No. 2018-555512, dated Apr. 3, 2020.
First Office Action of the Indian application No. 201817043250, dated Aug. 10, 2020.
First Office Action of the Taiwanese application No. 106118606, dated Oct. 23, 2020.
Supplementary European Search Report in the European application No. 20205925.9, dated Feb. 4, 2021.

* cited by examiner

METHOD, TERMINAL, AND BASE STATION FOR USE IN DATA TRANSMISSION

TECHNICAL FIELD

The disclosure relates to the field of communications, and more particularly to a data transmission method, a terminal and a base station.

BACKGROUND

Along with constant increase of requirements on data transmission rate, communication quality and the like of mobile communication, high-frequency-band broadband is introduced into wireless communication. A terminal may receive downlink control signaling such as system information or paging information through a low-frequency-band narrow-band cell and perform high-speed data transmission through a high-frequency-band broadband cell.

At present, there is such a known technology that, for solving the problem of relatively high received power consumption caused by the fact that a terminal in an idle state receives downlink signaling through a high-frequency-band broadband link, the terminal may reside in a low-frequency-band narrow-band cell, enter the idle state and receive system information and paging information in a low band. When the terminal has uplink data to be transmitted, the terminal may access a high-frequency-band broadband cell for high-speed data transmission.

However, a terminal has to perform a cell access process before the terminal can perform high-speed data transmission through a high-frequency-band broadband cell. Therefore, the process for initiating high-speed data transmission takes a relatively long time and has a relatively high signaling overhead.

SUMMARY

The disclosure provides a data transmission method and device, to enable a terminal to keep synchronized with both a low-frequency-band cell and a high-frequency-band cell, receive downlink control signaling transmitted by the low-frequency-band cell and, when high-speed data transmission is required, access the high-frequency-band cell as fast as possible or perform data transmission with the high-frequency-band cell, thereby reducing process and signaling overhead of a high-speed data service.

According to a first aspect, the disclosure provides a data transmission method, which may include that, when no data is to be transmitted or received, a terminal receives first indication information in a first cell using a first frequency band, the first indication information being configured to instruct the terminal receiving the first indication information to perform data transmission using a second frequency band when there is data to be transmitted or received; and when there is data to be transmitted or received, the terminal performs data transmission in a second cell using the second frequency band according to the first indication information.

When the terminal is in an idle state, or context of the terminal is still maintained at a previous serving base station but mobility management of the terminal may be implemented under a cell selection or cell reselection rule, it may be understood that the terminal is in a no-data-transmission state. In other words, mobility of the terminal is not directly controlled by a network.

The terminal completes synchronization with a target cell in advance on the first frequency band and, when there is data to be transmitted or received, performs data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted or received. Compared with the prior art, the method greatly reduces cell access process in the prior art and reduces a signaling overhead.

In combination with the first aspect, in a first possible implementation mode of the first aspect, the operation that the terminal performs data transmission in the second cell using the second frequency band according to the first indication information when there is data to be transmitted or received may include that, the terminal determines one or more second cells using the second frequency band as (a) target cell(s) according to the first indication information; the terminal performs cell synchronization with the target cell(s); and when there is data to be transmitted or received, the terminal uses the second frequency band for data transmission with the target cell(s).

The terminal determines the one or more second cells to be the target cell(s) according to the cell selection or cell reselection rule and performs data transmission with the target cell(s).

In combination with the first aspect or the abovementioned possible implementation mode thereof, in a second possible implementation mode of the first aspect, the first indication information may be paging information transmitted by a first base station through the first cell, or the first indication information may be the paging information and configuration information of the target cell(s), the first indication information may include information of a second frequency band and/or information of a base station containing the target cell(s) and/or information of the target cell, the first base station may be a base station containing the first cell. The operation that the terminal determines the one or more second cells using the second frequency band to be the target cell(s) according to the first indication information may include that, the terminal determines the target cell(s) according to the paging information; or the terminal determines the target cell(s) according to the paging information and the configuration information of the target cell(s).

When there is downlink data to be transmitted, the first base station may indicate the information of the second frequency band and/or information of the base station containing the target cell(s) and/or information of the target cell for data transmission required by the terminal through the paging information. Or, the first base station may also indicate the information of the second frequency band and/or information of the base station containing the target cell(s) and/or information of the target cell for data transmission required by the terminal through the paging information and the configuration information of the target cell(s). Therefore, the terminal may look for the target cell(s) in a smaller range and the efficiency of determining the target cell may be improved.

In combination with the first aspect or the abovementioned possible implementation modes thereof, in a third possible implementation mode of the first aspect, the first indication information may be system information of the second cell transmitted by the first base station through the first cell, the system information of the second cell may include information of the frequency band of the second cell and/or information of the base station (i.e., second base station) containing the second cell and/or information of the second cell, the first base station may be the base station containing the first cell. The operation that the terminal receives the first indication information in the first cell using the first frequency band when no data is to be transmitted or received may include that, the terminal receives system information of at least one second cell in the first cell using the first frequency band, the system information of the at least one second cell corresponding to the at least one second cell. The operation that the terminal determines the one or more second cells using the second frequency band to be the target cell(s) according to the first indication information may include that, the terminal determines one or more second cells from the at least one second cell to be the target cell(s) according to the system information of the at least one second cell.

When there is uplink data to be transmitted, the terminal may determine the target cell(s) for uplink data transmission through the information of the frequency band of the second cell and/or information of the base station containing the second cell and/or information of the second cell indicated by the system information and under the cell selection or cell reselection rule.

In combination with the first aspect or the abovementioned possible implementation modes thereof, in a fourth possible implementation mode of the first aspect, the operation that the terminal performs cell synchronization with the target cell(s) may include that, the terminal transmits an uplink synchronization request to a target base station containing the target cell(s) on the second frequency band, the uplink synchronization request is configured to obtain uplink synchronization information of the terminal and the target cell(s); the terminal receives the uplink synchronization information in the first cell, the uplink synchronization information is acquired by the first base station from the target base station, the uplink synchronization information is determined by the target base station on the basis of the uplink synchronization request and the first base station is the base station containing the first cell; and the terminal performs uplink synchronization with the target cell(s) according to the uplink synchronization information.

The terminal may transmit the uplink synchronization request on the second frequency band indicated by the first indication information to acquire the uplink synchronization information between the target cell(s) and the terminal and perform uplink synchronization with the target cell(s).

In combination with the first aspect or the abovementioned possible implementation modes thereof, in a fifth possible implementation mode of the first aspect, the operation that the terminal performs cell synchronization with the target cell(s) may include that, the terminal receives downlink synchronization information of the first cell in the first cell; the terminal determines downlink synchronization information of the target cell(s); and the terminal performs downlink synchronization with the target cell(s) according to the downlink synchronization information of the target cell(s).

In combination with the first aspect or the abovementioned possible implementation modes thereof, in a sixth possible implementation mode of the first aspect, the operation that the terminal determines the downlink synchronization information of the target cell(s) may include that, the terminal receives at least one downlink synchronization offset information transmitted by the first base station through the first cell and corresponding to the at least one second cell, each downlink synchronization offset information including a time offset between timing of the corresponding second cell and timing of the first cell and the first base station being the base station containing the first cell; and the terminal determines the downlink synchronization information of the target cell(s) according to the downlink synchronization offset information of the at least one second cell.

The terminal may acquire the downlink synchronization information of the first cell and the downlink synchronization information of the target cell(s) from the first base station for downlink synchronization with the target cell(s).

According to a second aspect, the disclosure provides a data transmission method, which may include that, a first base station determines first indication information. The first indication information is configured to instruct a terminal receiving the first indication information to transmit data in a second cell using a second frequency band, and the first base station is a base station to which a first cell using a first frequency band belongs; and the first base station transmits the first indication information through the first cell.

The terminal completes synchronization with a target cell in advance on the first frequency band and, when there is data to be transmitted or received, performs data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted or received. Compared with the prior art, the method greatly reduces cell access process in the prior art and reduces a signaling overhead.

In combination with the second aspect, in a first possible implementation mode of the second aspect, the first indication information may be paging information, or the first indication information may be the paging information and configuration information of a target cell, the first indication information may include information of a second frequency band and/or information of a target base station and/or information of the target cell, the second cell may include the target cell, a target base station may be a base station containing the target cell, and the operation that the first base station transmits the first indication information through the first cell may include that, the first base station transmits the paging information through the first cell; or the first base station transmits the paging information and the configuration information of the target cell through the first cell.

When there is downlink data to be transmitted, the first base station may indicate the information of the second frequency band and/or information of the target base station and/or information of the target cell for data transmission required by the terminal through the paging information.

In combination with the second aspect or the abovementioned implementation mode thereof, in a second possible implementation mode of the second aspect, the first indication information may be system information of the second cell, the system information of the second cell may include the information of the frequency band of the second cell and/or information of the base station containing the second cell and/or information of the second cell, and the operation that the first base station transmits the first indication information through the first cell may include that, the first base station receives system information of at least one second cell transmitted by at least one second base station, the system information of the at least one second cell corresponds to the at least one second cell; and the first base station transmits the system information of the at least one second cell through the first cell.

When there is uplink data to be transmitted, the terminal may determine the target cell for uplink data transmission through the information of the second frequency band and/or information of the second base station and/or information of the second cell indicated by the system information and through a cell selection or cell reselection rule.

In combination with the second aspect or the abovementioned implementation modes thereof, in a third possible implementation mode of the second aspect, the method may further include that, the first base station transmits uplink synchronization information through the first cell, the uplink synchronization information is acquired by the first base station from the target base station and the uplink synchronization information is determined by the target base station on the basis of an uplink synchronization request transmitted by the terminal to the target base station on the second frequency band, the target base station may be the base station containing the target cell, and the target cell may be determined by the terminal from the at least one second cell.

The terminal may transmit the uplink synchronization request on the second frequency band indicated by the first indication information to acquire the uplink synchronization information between the target cell and the terminal and perform uplink synchronization with the target cell.

In combination with the second aspect or the abovementioned implementation modes thereof, in a fourth possible implementation mode of the second aspect, the method may further include that, the first base station transmits downlink synchronization information of the first cell to the terminal through the first cell.

In combination with the second aspect or the abovementioned implementation modes thereof, in a fifth possible implementation mode of the second aspect, the method may further include that, the first base station transmits at least one downlink synchronization offset information corresponding to the at least one second cell to the terminal through the first cell, each downlink synchronization offset information includes a time offset between timing of the corresponding second cell and timing of the first cell.

The terminal may acquire the downlink synchronization information of the first cell and downlink synchronization information of the target cell from the first base station for downlink synchronization with the target cell.

According to a third aspect, the disclosure provides a data transmission method, which may include that, a second base station transmits system information of a second cell to a first base station, the system information is configured to indicate a system parameter of the second cell, a carrier frequency corresponding to the second cell belongs to a second frequency band, the first base station is a base station containing a first cell using a first frequency band and the second base station pre-stores a mapping relationship between the second cell and the first cell; and the second base station transmits data with a terminal through the second cell.

In combination with the third aspect, in a first possible implementation mode of the third aspect, the method may further include that, the second base station receives an uplink synchronization request transmitted by the terminal on the second frequency band, the uplink synchronization request is configured to obtain uplink synchronization information of the terminal and the second cell; and the second base station determines the uplink synchronization information according to the uplink synchronization request, and transmits the uplink synchronization information to the first base station.

The second base station may transmit the uplink synchronization information to the terminal through the uplink synchronization request received from the terminal on the second frequency band to facilitate uplink synchronization between the second base station and the terminal.

According to a fourth aspect, the disclosure provides a terminal, which is configured to execute the method in the first aspect or any possible implementation mode of the first aspect. Specifically, the terminal includes units configured to execute the method in the first aspect or any possible implementation mode of the first aspect.

According to a fifth aspect, the disclosure provides a base station, which is configured to execute the method in the second aspect or any possible implementation mode of the second aspect. Specifically, the base station includes units configured to execute the method in the second aspect or any possible implementation mode of the second aspect.

According to a sixth aspect, the disclosure provides another base station, which is configured to execute the method in the third aspect or any possible implementation mode of the third aspect. Specifically, the base station includes units configured to execute the method in the third aspect or any possible implementation mode of the third aspect.

According to a seventh aspect, the disclosure provides a terminal, which includes a transceiver, a processor, a memory and a bus system, the transceiver, the memory and the processor are connected through the bus system, the memory is configured to store instructions, the processor is configured to execute the instructions stored in the memory to control the transceiver to transmit and receive signals, and when the processor executes the instructions stored in the memory, such execution enables the processor to execute the method in the first aspect or any possible implementation mode of the first aspect.

According to an eighth aspect, the disclosure provides a base station, which includes a transceiver, a memory, a processor and a bus system, the transceiver, the memory and the processor are connected through the bus system, the memory is configured to store instructions, the processor is configured to execute the instruction stored in the memory to control the transceiver to transmit and receive signals, and when the processor executes the instructions stored in the memory, such execution enables the processor to execute the method in the second aspect or any possible implementation mode of the second aspect.

According to a ninth aspect, the disclosure provides another base station, which includes a transceiver, a memory, a processor and a bus system, the transceiver, the memory and the processor are connected through the bus system, the memory is configured to store instructions, the processor is configured to execute the instructions stored in the memory to control the transceiver to transmit and receive signals, and when the processor executes the instructions stored in the memory, such execution enables the processor to execute the method in the third aspect or any possible implementation mode of the third aspect.

According to a tenth aspect, the disclosure provides a computer-readable medium, which is configured to store a computer program, the computer program including instructions configured to execute the method in the first aspect or any possible implementation mode of the first aspect.

According to an eleventh aspect, the disclosure provides a computer-readable medium, which is configured to store a computer program, the computer program including an instruction configured to execute the method in the second aspect or any possible implementation mode of the second aspect.

According to a twelfth aspect, the disclosure provides a computer-readable medium, which is configured to store a computer program, the computer program including instructions configured to execute the method in the third aspect or any possible implementation mode of the third aspect.

In some implementation modes, the paging information includes the second frequency band information and/or the corresponding base station (i.e., target base station) information of the target cell and/or the target cell information, and the first base station is the base station containing the first cell.

In some implementation modes, the second frequency band information includes at least one of frequency band information, a bandwidth, a threshold value or an offset. The corresponding base station information of the target cell includes a target base station Identifier (ID). The target cell information includes at least one of a cell ID or a cell access technology.

In some implementation modes, the system information of the second cell includes the frequency band information of the second cell and/or the corresponding base station information of the second cell and/or the second cell information.

In some implementation modes, the second frequency band information includes at least one of the frequency band information, the bandwidth, the threshold value or the offset. The corresponding base station information of the second cell includes a second base station ID. The second cell information includes at least one of a cell ID or a cell access technology.

In some implementation modes, the uplink synchronization request and a transmitting resource are determined by the target base station and transmitted to the terminal through the first base station. Or, uplink synchronization request information is transmitted to the terminal by the first base station after the first base station requests the target base station and the target base station acknowledges the uplink synchronization request and allocates the transmitting resource. The uplink synchronization request information includes indication information of the transmitting resource.

According to the data transmission method, terminal and base station provided in the disclosure, the terminal may receive downlink control signaling on a low frequency band and, when high-speed data transmission is required, access a high-frequency-band cell as fast as possible or perform data transmission with the high-frequency-band cell, thereby reducing process and signaling overhead of a high-speed data service.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system and a Universal Mobile Telecommunication System (UMTS).

It is also to be understood that, in the embodiments of the disclosure, User Device (UE includes, but not limited to, a Mobile Station (MS), a mobile terminal, a mobile telephone, a handset, a fixed station, a fixed terminal, portable device and the like. The UE may communicate with one or more core networks through a Radio Access Network (RAN). For example, the UE may be a mobile telephone (or called a "cell" phone), a computer with a wireless communication function and the like. The UE may also be a portable, pocket, handheld, computer-embedded, instrument-embedded or vehicle-mounted device.

Figure 1:
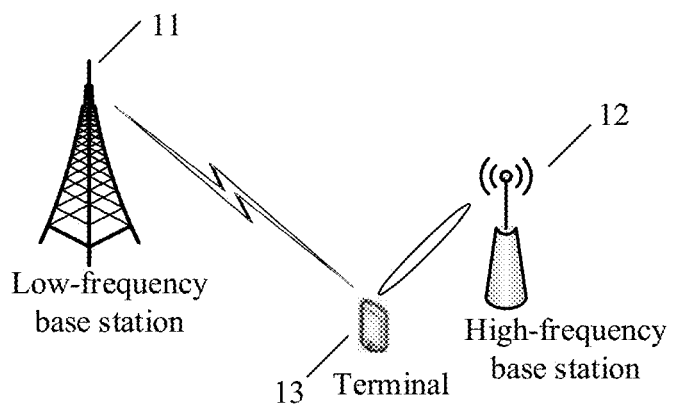
FIG. 1 illustrates a schematic diagram of an application scenario according to an embodiment of the disclosure.

FIG. 1 illustrates a schematic diagram of an application scenario according to an embodiment of the disclosure. FIG. 1 illustrates a high/low-frequency hybrid networking system, which includes a low-frequency base station 11, at least one high-frequency base station 12 and a terminal 13.

In the embodiment of the disclosure, a frequency band of the low-frequency base station 11 is lower than a frequency band of the high-frequency base station 12. The frequency band adopted for the low-frequency base station 11 may be a low frequency band below 6 GHz, for example, 2 GHz and 5 GHz. The frequency band adopted for the high-frequency base station 12 may be a millimeter frequency band (namely above 6 GHz) as a representative of a high frequency band. For example, the frequency used for the high-frequency base station 12 may be 72 GHz, 28 GHz or 14 GHz.

The low-frequency base station 11 covers a relatively large region. The high-frequency base station 12 implements hot spot coverage within the coverage of the low-frequency base station, to improve capacity of a hot region. The terminal 13 is usually configured with both a low-frequency transceiver and a high-frequency transceiver. The low-frequency transceiver is configured for data communication with the low-frequency base station 11. The high-frequency transceiver is configured for data communication with the high-frequency base station 12.

The terminal 13 may camp in a low-frequency cell and receive downlink control signaling from the low-frequency base station 11. The downlink control signaling may include downlink control signaling, for example, system information and paging information, of the low-frequency cell and a high-frequency cell. Meanwhile, the terminal may transmit data with the high-frequency base station 12 on the basis of the system information and paging information of the high-frequency cell received from the low-frequency base station 11.

It is to be understood that the terms "low frequency" and "high frequency" are only adopted to distinguish different frequency bands to which carrier frequencies corresponding to the cells belong. The carrier frequency of the low-frequency cell belongs to a low frequency band and the carrier frequency corresponding to the high-frequency cell belongs to a high frequency band. The low-frequency base station is a base station of the low-frequency cell and the high-frequency base station is a base station of the high-frequency cell. That is, for the base stations, a difference between low frequency and high frequency lies in that carriers used by the base stations are located on different frequency bands. Therefore, the low-frequency base station and the high-frequency base station may be the same base station which uses the carrier frequency of the low frequency band for data transmission and reception in the low-frequency cell and uses the carrier frequency of the high frequency band for data transmission and reception in the high-frequency cell. Or, the low-frequency base station and the high-frequency base station may be different base stations, the low-frequency base station uses the carrier frequency of the low frequency band for data transmission and reception and the high-frequency base station uses the carrier frequency of the high frequency band for data transmission and reception. There are no special limits made thereto in the disclosure.

In the embodiment of the disclosure, for convenience of distinction and description, the low-frequency base station may be denoted as a first base station, the low-frequency cell is denoted as a first cell, the high-frequency base station is denoted as a second base station and the high-frequency cell is denoted as a second cell. At least one second cell may be configured within the coverage of the first base station of the first cell. Each cell may correspond to a serving base station. Or, multiple second cells may share the same serving base station (i.e., the second base station).

It is to be understood that "first" and "second" are adopted only to distinguish low frequency and high frequency and should not form any limit to the disclosure. For example, the high-frequency base station may be denoted as the first base station, the high-frequency cell may be denoted as the first cell, the low-frequency base station may be denoted as the second base station and the low-frequency cell may be denoted as the second cell. It is also to be understood that the first base station and the second base station may be different base stations or may be the same base station.

In the embodiment of the disclosure, the terminal, after determining to transmit data on a second frequency band, may receive system information transmitted by each of the at least one second cell on the second frequency band. The terminal determines a cell for data transmission with the terminal from the at least one second cell according to a cell selection or cell reselection rule. For convenience of distinction and description, the cell determined by the terminal is denoted as a target cell and a serving cell of the target cell is denoted as a target base station. It is to be understood that both the target base station and the second base station may be high-frequency base stations and the terms "target base station" and "second base station" are only adopted to distinguish whether they are base stations configured for data transmission with the terminal. The target base station is relative. For example, for a terminal A, a base station A may be a target base station; and for a terminal B, a base station B may be a target base station.

It is to be understood that the target cell may share the same serving base station with another cell in the at least one second cell. The target cell may also share the same serving base station (i.e., the first base station) with the first cell. The target base station may also be the serving base station of the target cell only. There are no special limits made to a mapping relationship between a base station and a cell in the disclosure.

It is also to be understood that, in the following embodiments of the disclosure, the first base station is a base station containing the first cell, the second base station is a base station to which the second cell belongs and the target base station is a base station containing the target cell. However, the first base station, the second base station and the target base station are not limited and they may also be base stations containing other cells. In the embodiment of the disclosure, exemplary descriptions will be made only with the condition that the first base station transmits information through the first cell, the second base station transmits information through the second cell and the target base station transmits information through the target cell as an example and should not form any limit to the disclosure. For example, the first base station may also transmit information through another cell. There are no special limits made thereto in the disclosure.

For convenience of understanding and description, a data transmission method according to the embodiments of the disclosure will be described below in combination with FIG. 2 in detail with the condition that the first base station and the second base station are different base stations as an example. It is to be understood that the condition that the first base station and the second base station are different base stations is only for exemplary descriptions and should not form any limit to the disclosure. When the first base station and the second base station are the same base station, data transmission between the terminal and the high-frequency base station may still be implemented by executing the method 200.

Figure 2:
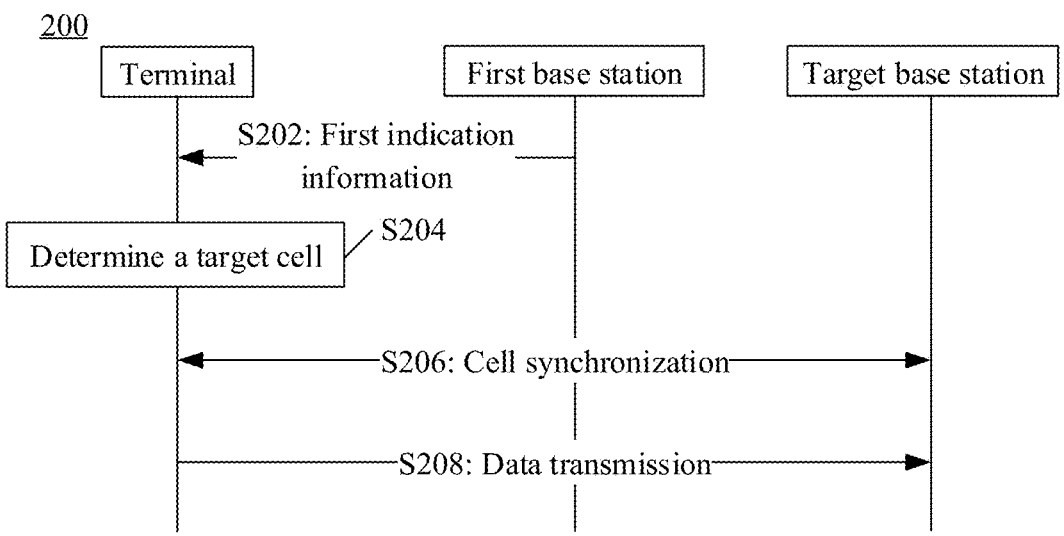
FIG. 2 illustrates a schematic flowchart of a data transmission method according to an embodiment of the disclosure.

FIG. 2 illustrates a schematic flowchart of a data transmission method 200 according to an embodiment of the disclosure. It is to be understood that FIG. 2 illustrates detailed communication actions or operations of the data transmission method described from the view of interaction among a terminal, a low-frequency base station (for example, a first base station) and a high-frequency base station (for example, a target base station) according to an embodiment of the disclosure. However, these actions or operations are only examples and other operations or transformations of various operations in FIG. 2 may also be executed in the embodiment of the disclosure. In addition, each action in FIG. 2 may be executed in a sequence different from that presented in FIG. 2 and not all the operations in FIG. 2 may be executed.

It is to be understood that the schematic flowchart of interaction among the terminal, the first base station and the second base station in FIG. 2 is only exemplarily described and should not form any limit to the disclosure. In the embodiment of the disclosure, the first base station (i.e., an example of the low-frequency base station) may form a mapping relationship with at least one high-frequency base station (for example, including a second base station). That is, the terminal camping in the low-frequency cell may transmit data with the at least one high-frequency base station.

As illustrated in FIG. 2, the method 200 includes the following actions.

In S202, when no data is to be transmitted or received, a terminal receives first indication information in a first cell using a first frequency band.

Specifically, when a terminal is in an idle state, or when context of the terminal is still maintained at a previous serving base station but the terminal may perform mobility management under a cell selection or cell reselection rule, it may be understood that the terminal is in a no-data-transmission state. In other words, mobility of the terminal is not directly controlled by a network.

Here, the previous serving base station may be the first base station in the embodiment of the disclosure or may be another base station. There are no special limits made thereto in the disclosure.

It is to be noted that the first cell does not specifically mean a specific cell and the first cell may be a certain cell in a type of cells transmitting the first indication information.

Specifically, a zone to be covered is divided into a plurality of regions, an access point is set in each region to serve users in the region, and the region is a cell. The definition of the cell may follow the existing concept of the cell, or may be one or more adjacent beams in beam forming, or may be a carrier in the region.

In the embodiment of the disclosure, the first base station transmits the first indication information through the first cell (or on the first frequency band). The first indication information instructs the terminal to transmit data on a second frequency band. The terminal receiving the first indication information may transmit data in the second cell using the second frequency band according to the first indication information.

It is to be noted that the second cell does not specifically mean a specific cell. Instead, the second cell may be a certain cell in cells using the second frequency band indicated by the first indication information, or may be a cell indicated by the first indication information. Specifically, the cell may be an existing cell, or may be one or more adjacent beams in beam forming, or may be a carrier in the region.

It is to be understood that "first" and "second" are adopted only for distinction and should not form any limit to the disclosure. It is also to be understood that the first base station is a base station containing the first cell, or the first base station is a serving base station of the first cell. The second base station is a base station to which the second cell belongs, or the second base station is a serving base station of the second cell. The first base station may correspond to a cell, i.e., the first cell, and may also be a serving base station of multiple cells. The second base station may correspond to a cell, i.e., the second cell, and may also be a serving base station of multiple cells. There are no special limits made in the disclosure.

In the embodiment of the disclosure, the first base station is an example of a low-frequency base station and may cover a relatively large region. The second base station is an example of a high-frequency base station and may implement hot spot coverage in coverage of the first base station. That is, there may be one or more second cells in the first cell. As a serving base station of the second cell, a mapping relationship with the low-frequency base station may be pre-stored in each high-frequency base station. Or, each high-frequency base station may pre-store the mapping relationship with the low-frequency base station and coverage of the high-frequency base station is within the coverage of the low-frequency base station. Each high-frequency base station may periodically transmit system information or paging information of the high-frequency cell served by the high-frequency base station to the corresponding low-frequency base station according to the mapping relationship.

In other words, the second base station within the coverage of the first base station forms the mapping relationship with the first base station and each second base station in at least one second base station within the coverage of the first base station may transmit the system information or paging information of the corresponding cell to the first base station through an interface between the base stations. Specifically, the system information or paging information of the second cell may be periodically broadcast, and may be acquired by the first base station from the second base station through an X2 interface or an interface with a function as same as or similar to that of the X2 interface.

For example, a base station A (i.e., an example of the second base station) within the coverage of the first base station may transmit system information or paging information of a cell A (i.e., an example of the second cell) to the first base station through an interface between the base station A and the first base station. A base station B (i.e., another example of the second base station) within the coverage of the first base station may transmit system information or paging information of a cell B (i.e., another example of the second cell) to the first base station through an interface between the base station B and the first base station.

It is to be understood that the X2 interface between the base stations is listed above only for exemplary description, and should not form any limit to the disclosure. Communication between the base stations through the interface with the function as same as or similar to that of the X2 interface should not be excluded in the disclosure.

It is also to be understood that the method by which the second base station transmits the system information or paging information of the second cell to the first base station through the interface between the base stations is listed above only as a possible implementation mode about that the first base station acquire the system information or the paging system, and should not form any limit to the disclosure. For example, the first base station may also pre-configure the system information and paging information of the second cell for periodic broadcast in the first cell.

It is to be noted that the terminal, when being located within the coverage of the first base station, may receive a downlink synchronization signal (denoted as a first downlink synchronization signal for convenience of distinction and description) of the first base station in the first cell (or on the first frequency band) for downlink synchronization with the first cell and, after downlink synchronization with the first cell, camp in the first cell. In this case, the terminal may receive downlink control signaling (for example, the system information and the paging information) broadcast by the first base station. It is to be understood that a method by which the terminal performs downlink synchronization with the first cell on the first frequency band is similar to the prior art and will not be elaborated herein for simplicity.

Or, when the first base station is a previous serving base station of the terminal, context of the terminal is still maintained at the first base station and the downlink control signaling transmitted by the first base station may be received on the first frequency band.

Without loss of generality, the first base station, after determining the second frequency band, may transmit the first indication information in the first cell in a broadcast form, the first indication information being configured to instruct terminals (including the abovementioned terminal) within the coverage of the first cell or the terminal receiving the first indication information to transmit data with the second cell using the second frequency band. It is to be understood that there are multiple terminals in the coverage of the first cell and each terminal, after receiving the first indication information broadcast by the first base station through the first cell, may determine a target cell for respective data transmission and perform cell synchronization and data transmission with the respective target cell. The terminal mentioned above does not specifically mean a specific terminal, and the terminal may be a certain terminal receiving the first indication information in a type of cells.

In S204, the terminal determines one or more second cells using the second frequency band as (a) target cell(s) according to the first indication information.

In the embodiment of the disclosure, the at least one second cell includes the target cell(s) and the system information includes system information of the target cell(s). If there is only one second cell in the coverage of the first base station, the terminal may directly determine the second cell to be the target cell according to the first indication information and perform data transmission with the target cell. If there are two or more second cells in the coverage of the first base station, the terminal may receive system information transmitted by each second cell in the at least one second cell on the second frequency band according to the second frequency band indicated by the first indication information. The terminal may determine one or more second cells in the at least one second cell to be the target cell(s) according to the cell selection or cell reselection rule. A method by which the terminal determines the target cell(s) according to the cell selection or cell reselection rule may be implemented through the prior art. Detailed descriptions about a specific process by which the terminal determines the target cell(s) are omitted herein for simplicity.

It is to be understood that the terminal may select the one or more second cells to be the target cell(s) on the second frequency band according to the cell selection or cell reselection rule. There are no special limits made to the number of the target cell(s) in the disclosure.

In the embodiment of the disclosure, the first indication information broadcast by the first base station may be paging information. Or, the first indication information broadcast by the first base station may be the paging information and configuration information of the target cell(s). Or, the first indication information may be system information.

Alternatively, the first indication information is the paging information transmitted by the first base station through the first cell, or the first indication information is the paging information and configuration information of the target cell(s). The first indication information includes information of a second frequency band and/or information of a base station (i.e., target base station) containing the target cell(s) and/or information of the target cell.

The information of the second frequency band includes at least one of frequency band information, bandwidth, a threshold value or an offset. The information of the base station of which the target cell includes a target base station ID. The information of target cell includes at least one of a cell ID or a cell access technology.

Alternatively, the operation in S204 that the terminal determines the one or more second cells using the second frequency band to be the target cell(s) according to the first indication information includes one of the following two actions.

The terminal determines the target cell(s) according to the paging information.

The terminal determines the target cell(s) according to the paging information and the configuration information of the target cell(s).

Specifically, a network side, when having downlink data to be transmitted to the terminal, may transmit a paging message to notify the terminal. For example, the paging message may directly be transmitted to the first base station by a core network, and then the first base station generates the paging information to be transmitted in the first cell according to the paging message. Specifically, the first base station may generate the first indication information according to the paging message, the first indication information including the information of the second frequency band and/or information of the base station (i.e., target base station) containing the target cell(s) and/or information of the target cell, and the first indication information being transmitted in the first cell in form of the paging information. Or, the first base station adds the information of the second frequency band and/or information of the base station (i.e., target base station) containing the target cell(s) and/or information of the target cell into the paging information to be transmitted in the first cell. The first base station transmits the paging information in the first cell, to enable the terminal to determine the target cell(s) when receiving the paging information and further transmit data with the target cell(s).

Furthermore, the first base station, after receiving the paging message transmitted by the core network, may further determine the configuration information of the target cell(s) according to a paging region, and generate the first indication information on the basis of the paging message and the configuration information of the target cell(s). The terminal, after receiving the first indication information, may look for the target cell(s) in a smaller range according to the paging information and the configuration information of the target cell(s), and transmit data with the target cell(s). For example, the paging region indicated by the paging information is five second cells on the second frequency band, and the configuration information of the target cell(s) indicates that the target cell(s) is within a range of three second cells in the five second cells. Therefore, the range where the terminal looks for the target cell(s) is narrowed, and the efficiency of determining the target cell by the terminal may be improved.

Alternatively, the first indication information is the system information of the second cell transmitted by the first base station through the first cell. The system information includes the information of the second frequency band and/or information of the base station (i.e., second base station) containing the second cell and/or information of the second cell.

The operation in S202 that the terminal receives the first indication information in the first cell using the first frequency band when no data is to be transmitted or received includes that, the terminal receives system information of at least one second cell in the first cell using the first frequency band, the system information of the at least one second cell corresponding to the at least one second cell.

The second frequency hand information includes at least one of the frequency band information, the bandwidth, the threshold value or the offset. The corresponding base station information of the second cell includes a second base station ID. The second cell information includes at least one of a cell ID or a cell access technology. It is to be understood that specific contents of the second frequency band information, the corresponding base station information of the cells (including the target cell(s) and the second cell) and the cell (including the target cell(s) and the second cell) information are listed above only for exemplary description and should not form any limit to the disclosure. The disclosure is also not limited thereto.

Alternatively, the operation in S204 that the terminal determines the one or more second cells using the second frequency band to be the target cell(s) according to the first indication information includes that, the terminal determines one or more second cells in the at least one second cell to be the target cell(s) according to the system information of the at least one second cell.

The terminal determines the one or more second cells from the at least one second cell to be the target cell(s) according to the system information of the at least one second cell on the basis of the cell selection or cell reselection rule.

Exemplarily but unlimitedly, the access technology includes an LTE technology, Wireless-Fidelity (Wi-Fi), a UTMS technology or a 5th-Generation (5G) mobile communication technology.

It is to be understood that the access technology is listed above only for exemplary description and should not form any limit to the disclosure. The disclosure is also not limited thereto. The terminal may also communicate through another existing access technology or another future access technology.

In S206, the terminal performs cell synchronization with the target cell(s).

Specifically, before the operation that the terminal performs data transmission in the second cell using the second frequency band according to the first indication information when there is data to be transmitted, the method 200 further includes that, the terminal performs cell synchronization with the target cell(s) according to the first indication information.

Synchronization between the terminal and the target cell(s) may be classified into downlink synchronization and uplink synchronization.

At first, the terminal performs downlink synchronization with the target cell(s). In the embodiment of the disclosure, the terminal may directly receive a downlink synchronization signal (denoted as a target downlink synchronization signal for convenience of distinction and description) periodically broadcast by the target base station on the second frequency band for downlink synchronization with the target cell(s), and may also receive downlink synchronization information of the target cell(s) transmitted by the first base station on the first frequency band and perform downlink synchronization with the target cell(s) according to the downlink synchronization information. A specific process of downlink synchronization between the terminal and the target cell(s) will be described below in detail.

In an implementation mode, the operation that the terminal performs downlink synchronization with the target cell(s) specifically includes the following operations.

The terminal receives at least one downlink synchronization signal transmitted by at least one second base station on the second frequency band according to the first indication information. The at least one downlink synchronization signal corresponds to the at least one second base station. Each downlink synchronization signal is from the corresponding second base station.

The terminal determines the downlink synchronization signals of the target cell(s) from the at least one downlink synchronization signal.

The terminal performs downlink synchronization with the target cell(s) according to the downlink synchronization signals of the target cell(s).

Specifically, each second base station (including the target base station) may periodically broadcast the downlink synchronization signal of each second cell on the second frequency band, for example, Primary Synchronization Signals (PSSs) and Secondary Synchronization Signals (SSSs).

If there is only one second cell on the second frequency band, the second cell is a target cell of the terminal. The terminal, after receiving a PSS and SSS broadcast by a base station (i.e., a second base station or a target base station) of the second cell on the second frequency band, completes frame synchronization and acquires a cell ID of the cell (i.e., the target cell) corresponding to the downlink synchronization signals, thereby completing downlink synchronization of the terminal and the target cell.

If there are multiple second cells on the second frequency band, a base station of each second cell may periodically broadcast a downlink synchronization signal (denoted as a second downlink synchronization signal for convenience of distinction and description) of the respective cell. The second downlink synchronization signal includes a downlink synchronization signal of a target cell. The terminal, when receiving the second downlink synchronization signals of the multiple second cells on the second frequency band, may determine the downlink synchronization signal of the target cell according to a cell ID of each second cell corresponding to the second downlink synchronization signal of the second cell, and a cell ID of the target cell indicated by the first indication information or the cell Ill of the target cell determined through cell selection or cell reselection, and complete downlink synchronization with the target cell.

In another implementation mode, the operation that the terminal performs downlink synchronization with the target cell(s) specifically includes the following actions.

The terminal receives downlink synchronization information of the first cell in the first cell.

The terminal determines downlink synchronization information of the target cell(s).

The terminal performs downlink synchronization with the target cell(s) according to the downlink synchronization information of the target cell(s).

The operation that the terminal determines the downlink synchronization information of the target cell(s) includes the following actions.

The terminal receives at least one downlink synchronization offset information from the first base station through the first cell and corresponding to the at least one second cell, each downlink synchronization offset information including a time offset between timing of the corresponding second cell and timing of the first cell and the first base station being the base station containing the first cell.

The terminal determines the downlink synchronization information of the target cell(s) according to the downlink synchronization offset information of the at least one second cell.

Specifically, the terminal may receive the downlink synchronization information of the first cell from the first base station, the downlink synchronization information of the first cell indicating a time offset between timing of the terminal and the first cell. The terminal may further determine the downlink synchronization information of the target cell(s) the downlink synchronization information of the target cell(s) indicating (a) time offset(s) between timing of the first cell and the second cell(s).

The terminal may determine the downlink synchronization information of the target cell(s) according to pre-stored time offsets between base stations. For example, the terminal knows that the time offset between the base stations is 2 ms.

The terminal may also determine the downlink synchronization information of the target cell(s) according to downlink synchronization information of the second cell transmitted by the first base station. Specifically, the first base station transmits at least one downlink synchronization information corresponding to the at least one second cell to the terminal, each downlink synchronization information including the time offset between the timing of the corresponding second cell and the first cell. The terminal may determine the time offsets of the target cell(s) according to the determined cell information of the target cell(s).

The terminal, after completing downlink synchronization with the target cell(s), may further perform uplink synchronization with the target cell(s).

Alternatively, the operation that the terminal performs uplink synchronization with the target cell(s) specifically includes the following actions.

The terminal transmits an uplink synchronization request to the target base station containing the target cell(s) on the second frequency band. The uplink synchronization request is configured to obtain the uplink synchronization information of the terminal and the target cell(s).

The terminal receives uplink synchronization information in the first cell. The uplink synchronization information is acquired by the first base station from the target base station, the uplink synchronization information is determined by the target base station on the basis of the uplink synchronization request and the uplink synchronization information indicating a time offset between timing of the terminal and the base station.

The terminal performs uplink synchronization with the target cell(s) according to the uplink synchronization information.

The uplink synchronization request or a transmitting resource (for example, a time-frequency resource) is determined by the target base station and transmitted to the terminal through the first base station.

Uplink synchronization request information is transmitted to the terminal by the first base station, after the target base station receives the uplink synchronization request from the terminal, acknowledges the uplink synchronization request, and allocates the transmitting resource.

The uplink synchronization request information includes indication information of the transmitting resource.

Specifically, the terminal, before transmitting the uplink synchronization request to the target base station on the second frequency band, is required to know the time-frequency resource for transmitting the uplink synchronization request. The time-frequency resource may be requested by the first base station from the target base station. Specifically, the first base station determines the time-frequency resource, and then transmits the request for the time-frequency resource to the target base station, the target base station specifies the time-frequency resource, and then the first base station transmits the indication information of the time-frequency resource to the terminal. The time-frequency resource may also be directly determined by the target base station and the indication information of the time-frequency resource is transmitted to the terminal by the first base station. The terminal, after receiving the indication information of the time-frequency resource, may transmit the uplink synchronization request to the target base station on the specified time-frequency resource. Or, the terminal transmits a Random Access (RA) request to the target base station on the second frequency band. The uplink synchronization request may include a random access preamble. The target base station, after receiving the uplink synchronization signal, may determine the uplink synchronization information according to the received uplink synchronization request. The uplink synchronization signal indicates the timing of the terminal, and the uplink synchronization information indicates the time offset between the timing of the terminal and the timing of the target base station. Alternatively, the time offset may be an uplink transmitting Time Alignment (TA). The terminal, after receiving the uplink synchronization information, may regulate uplink transmitting time according to the time offset to complete uplink synchronization with the target cell(s). Or, the terminal completes uplink synchronization for the target cell(s).

In the embodiment of the disclosure, the uplink synchronization information to be transmitted to the terminal by the target base station may be forwarded through the first base station. That is, the terminal receives the uplink synchronization information of the target cell(s) from the first base station on the first frequency band, and the uplink synchronization information of the target cell(s) is acquired by the first base station from the target base station.

Therefore, the terminal completes uplink and downlink synchronization with the target cell(s). In the embodiment of the disclosure, for reducing relatively high power consumption probably brought by reception of the downlink control signaling by the terminal camping on the target cell(s), the terminal may be controlled to, when there is no data transmission, keep synchronized with the low-frequency cell (for example, the first cell) and the target cell(s), and receive the downlink control signaling of the target cell(s) in the low-frequency cell and, when there is data to be transmitted, transmit data with the target base station.

In S208, when there is data to be transmitted, the terminal performs data transmission with the target cell(s) using the second frequency band.

Specifically, data transmission of the terminal includes uplink data transmission and downlink data transmission.

When the terminal has uplink data to be transmitted, the terminal may directly transmit data to the target cell(s) according to the received system information of the target cell(s). When the network side has downlink data to be transmitted to the terminal, the paging information may be transmitted firstly to enable the terminal to access the target cell(s) or transmit data with the target cell(s) according to the paging information.

When there is uplink data to be transmitted, the first indication information is the system information of each second cell. The first base station may acquire the system information of each second cell from the serving base station (i.e., the second base station) of the second cell, or may pre-store the system information of each second cell. The first base station may periodically broadcast the system information of each second cell. The terminal may determine the system information of the target cell(s) according to the received system information of each second cell and the cell IDs of the target cell(s) determined by the terminal and transmit data with the target base station according to the system information of the target cell(s).

When there is downlink data to be transmitted, the first indication information is the paging information, or the first indication information is the paging information and the configuration information of the target cell(s). The terminal may directly determine the target cell(s) according to the first indication information and transmit data with the target base station.

In such a manner, according to the data transmission method of the embodiment of the disclosure, the terminal completes synchronization with a target cell in advance on the first frequency band and, when there is data to be transmitted, performs data transmission with the target cell, so that relatively high power consumption probably brought by reception of downlink control signaling by the terminal camping on a high frequency band is avoided. Meanwhile, synchronization with the target cell is completed in advance to make it possible to access a high-frequency-band cell as fast as possible or implement data transmission with the target cell when there is data to be transmitted. Compared with the prior art, the method greatly reduces the cell access flow in the prior art and reduces a signaling overhead.

The data transmission method according to the embodiments of the disclosure has been described above in combination with FIG. 2 in detail. A data transmission device according to the embodiments of the disclosure will be described below in combination with FIG. 3 to FIG. 5 in detail.

Figure 3:
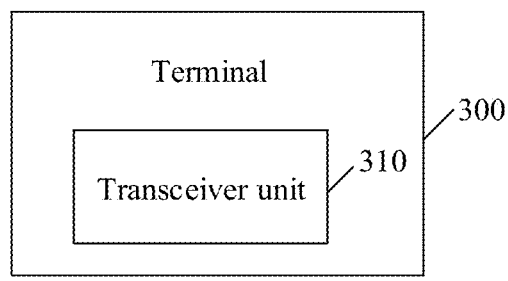
FIG. 3 illustrates a schematic block diagram of a terminal according to an embodiment of the application.

FIG. 3 illustrates a schematic block diagram of a terminal 300 according to an embodiment of the disclosure. As illustrated in FIG. 3, the terminal 300 includes a transceiver unit 310.

The transceiver unit 310 is configured to, when no data is to be transmitted or received, receive first indication information in a first cell using a first frequency band, the first indication information being configured to instruct the terminal receiving the first indication information to perform data transmission using a second frequency band when there is data to be transmitted.

The transceiver unit 310 is further configured to, when there is data to be transmitted, perform data transmission in a second cell using the second frequency band according to the first indication information.

Alternatively, the terminal 300 further includes a determination unit and a processing unit.

The determination unit is configured to determine one or more second cells using the second frequency band to be (a) target cell(s) according to the first indication information.

The processing unit is configured to perform cell synchronization with the target cell(s).

The transceiver unit 310 is specifically configured to, when there is data to be transmitted, perform data transmission with the target cell(s) using the second frequency band.

Alternatively, the first indication information is paging information transmitted by a first base station through the first cell, or the first indication information is paging information and configuration information of the target cell(s). The first indication information includes information of a second frequency band and/or information of a base station (i.e., target base station) containing the target cell(s) and/or information of the target cell. The first base station is a base station containing the first cell.

The determination unit is specifically configured to determine the target cell(s) according to the paging information.

Or, the determination unit is specifically configured to determine the target cell(s) according to the paging information and the configuration information of the target cell(s).

Alternatively, the first indication information is system information of the second cell transmitted by the first base station through the first cell. The system information of the second cell includes the information of the frequency hand of the second cell and/or information of the base station (i.e., second base station) containing the second cell and/or information of the second cell. The first base station is the base station containing the first cell.

The transceiver unit 310 is specifically configured to receive system information of at least one second cell in the first cell using the first frequency band. The system information of the at least one second cell corresponds to the at least one second cell.

The determination unit is specifically configured to determine one or more second cells from the at least one second cell to be (a) target cell(s) according to the system information of the at least one second cell.

Alternatively, the transceiver unit 310 is further configured to transmit an uplink synchronization request to a target base station containing the target cell(s) on the second frequency band. The uplink synchronization request is configured to obtain uplink synchronization information between the terminal and the target cell(s).

The transceiver unit 310 is further configured to receive the uplink synchronization information in the first cell. The uplink synchronization information is acquired by the first base station from the target base station, the uplink synchronization information is determined by the target base station on the basis of the uplink synchronization request, and the first base station is the base station containing the first cell.

The processing unit is specifically configured to perform uplink synchronization with the target cell(s) according to the uplink synchronization information.

Alternatively, the transceiver unit 310 is further configured to receive downlink synchronization information of the first cell in the first cell.

The determination unit is further configured to determine downlink synchronization information of the target cell(s).

The processing unit is specifically configured to perform downlink synchronization with the target cell(s) according to the downlink synchronization information of the target cell(s).

Alternatively, the transceiver unit 310 is further configured to receive at least one downlink synchronization offset information transmitted by the first base station through the first cell and corresponding to the at least one second cell. Each downlink synchronization offset information includes a time offset between timing of the corresponding second cell and timing of the first cell, and the first base station is the base station containing the first cell.

The determination unit is specifically configured to determine the downlink synchronization information of the target cell(s) according to the downlink synchronization offset information of the at least one second cell.

The terminal 300 according to the embodiment of the disclosure may correspond to a terminal in the data transmission method of the embodiments of the disclosure. Moreover, each unit in the terminal 300 and the other abovementioned operations and/or functions are adopted to implement the corresponding flows of the method in FIG. 2 respectively and will not be elaborated herein for simplicity.

In such a manner, the terminal according to the embodiment of the disclosure completes synchronization with a target cell in advance on the first frequency band and, when there is data to be transmitted, performs data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with the prior art, the terminal according to the embodiment of the disclosure greatly reduces cell access process in the prior art and reduces a signaling overhead.

Figure 4:
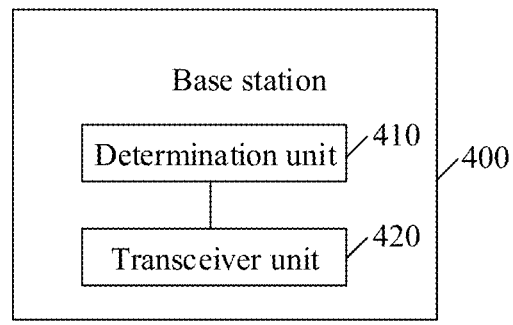
FIG. 4 illustrates a schematic block diagram of a base station according to an embodiment of the application.

FIG. 4 illustrates a schematic block diagram of a base station 400 according to an embodiment of the disclosure. As illustrated in FIG. 4, the base station 400 includes a determination unit 410 and a transceiver unit 420.

The determination unit 410 is configured to determine first indication information. The first indication information is configured to instruct a terminal receiving the first indication information to transmit data in a second cell using a second frequency band. The base station is a base station containing a first cell using a first frequency band.

The transceiver unit 420 is configured to transmit the first indication information through the first cell.

Alternatively, the first indication information is paging information or paging information and configuration information of a target cell. The first indication information includes information of a second frequency band and/or information of a base station (i.e., target base station) containing the target cell(s) and/or information of the target cell. The second cell includes the target cell. A target base station is a base station containing the target cell.

The transceiver unit 420 is specifically configured to transmit the paging information through the first cell.

Or, the transceiver unit 420 is specifically configured to transmit the paging information and the configuration information of the target cell through the first cell.

Alternatively, the first indication information is system information of the second cell. The system information of the second cell includes information of the frequency band of the second cell and/or information of a base station containing the second cell and/or information of the second cell.

The transceiver unit 420 is further configured to receive system information of at least one second cell, transmitted by at least one second base station, the system information of the at least one second cell corresponding to the at least one second cell.

The transceiver unit 420 is specifically configured to transmit the system information of the at least one second cell through the first cell.

Alternatively, the transceiver unit 420 is further configured to transmit uplink synchronization information through the first cell. The uplink synchronization information is acquired by the base station from the target base station, and the uplink synchronization information is determined by the target base station on the basis of an uplink synchronization request transmitted to the target base station by the terminal on the second frequency band. The target base station is the base station containing the target cell. The target cell is determined by the terminal from the at least one second cell.

Alternatively, the transceiver unit 420 is further configured to transmit downlink synchronization information of the first cell to the terminal through the first cell.

Alternatively, the transceiver unit 420 is further configured to transmit at least one downlink synchronization offset information corresponding to the at least one second cell to the terminal through the first cell. Each downlink synchronization offset information includes a time offset between timing of the corresponding second cell and timing of the first cell.

The base station 400 according to the embodiment of the disclosure may correspond to a first base station in the data transmission method of the embodiments of the disclosure. Moreover, each unit in the base station 400 and the other abovementioned operations and/or functions are adopted to implement the corresponding flows of the method in FIG. 2 respectively and will not be elaborated herein for simplicity.

In such a manner, the base station according to the embodiment of the disclosure transmits downlink control signaling to the terminal on the first frequency band, to enable the terminal to complete synchronization with a target cell in advance on the first frequency band, and when there is data to be transmitted, the terminal may perform data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with a prior art, the base station according to the embodiment of the disclosure greatly reduces cell access process in the prior art and reduces a signaling overhead.

Figure 5:
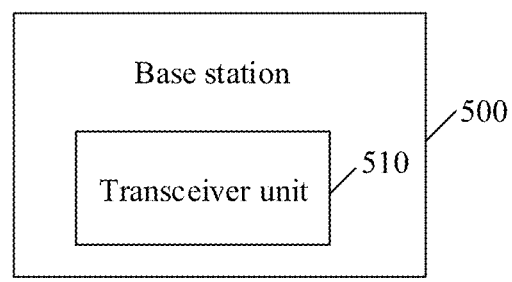
FIG. 5 illustrates a schematic block diagram of another base station according to another embodiment of the application.

FIG. 5 illustrates a schematic block diagram of another base station 500 according to another embodiment of the disclosure. As illustrated in FIG. 5, the base station 500 includes a transceiver unit 510.

The transceiver unit 510 is configured to transmit system information of a second cell to a first base station. The system information is configured to indicate a system parameter of the second cell, a carrier frequency corresponding to the second cell belongs to a second frequency band, the first base station is a base station containing a first cell using a first frequency band and the second base station pre-stores a mapping relationship between the second cell and the first cell.

The transceiver unit 510 is further configured to transmit data with a terminal through the second cell.

Alternatively, the transceiver unit 510 is further configured to receive an uplink synchronization request transmitted by the terminal on the second frequency band. The uplink synchronization request is configured to obtain uplink synchronization information of the terminal and the second cell.

The transceiver unit 510 is further configured to determine the uplink synchronization information according to the uplink synchronization request and transmit the uplink synchronization information to the first base station.

The base station 500 according to the embodiment of the disclosure may correspond to a second base station in the data transmission method of the embodiments of the disclosure. Moreover, each unit in the base station 500 and the other abovementioned operations and/or functions are adopted to implement the corresponding flows of the method in FIG. 2 respectively and will not be elaborated herein for simplicity.

In such a manner, according to the base station of the embodiment of the disclosure, the terminal in the first cell completes synchronization with the target cell in advance, and when there is data to be transmitted, data transmission is performed with the terminal, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with the prior art, the base station of the embodiment of the disclosure greatly reduces cell access process in the prior art and reduces a signaling overhead.

The data transmission device according to the embodiments of the disclosure has been described above in combination with FIG. 3 to FIG. 5 in detail. A data transmission device according to the embodiments of the disclosure will be described below in combination with FIG. 6 to FIG. 8 in detail.

Figure 6:
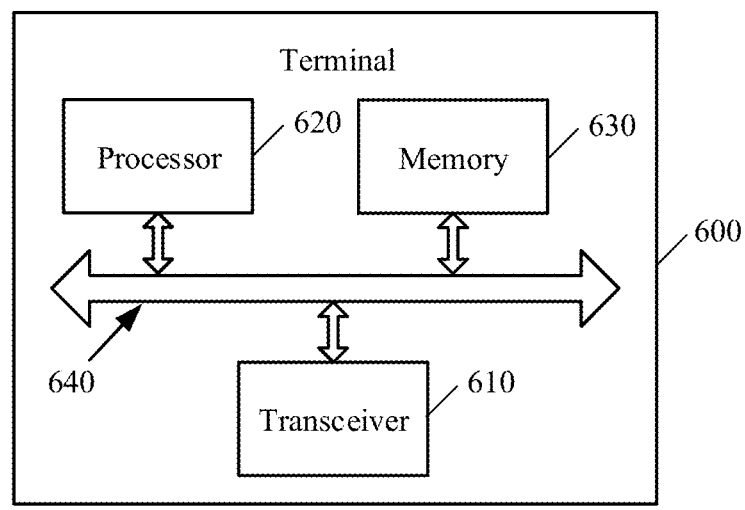
FIG. 6 illustrates another schematic block diagram of a terminal according to an embodiment of the application.

FIG. 6 illustrates a schematic block diagram of a terminal 600 according to an embodiment of the disclosure. As illustrated in FIG. 6, the terminal 600 includes a transceiver 610, a processor 620, a memory 630 and a bus system 640. The processor 620, the memory 630 and the transceiver 610 are connected through the bus system 640. The memory 630 is configured to store instructions. The processor 620 is configured to execute the instructions stored in the memory 630 to control the transceiver 610 to transmit and receive information.

The transceiver 610 is configured to, when no data is to be transmitted or received, receive first indication information in a first cell using a first frequency band. The first indication information is configured to instruct the terminal receiving the first indication information to perform data transmission using a second frequency band when there is data to be transmitted.

The transceiver 610 is further configured to, when there is data to be transmitted, perform data transmission in a second cell using the second frequency band according to the first indication information.

It is to be understood that, in the embodiment of the disclosure, the processor 620 may be a Central Processing Unit (CPU), or the processor 620 may be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 630 may include a Read-Only Memory (ROM) and a Random Access Memory (RAM) and provides an instruction and data for the processor 620. A part of the memory 630 may further include a nonvolatile RAM. For example, the memory 630 may further store information of a device type.

The bus system 640 includes a data bus, and may further include a power bus, a control bus, a state signal bus and the like. However, for clear description, various buses in the figure are marked as the bus system 640.

In an implementation process, each action of the method may be completed by an integrated logic circuit of hardware in the processor 620 or instructions in a software form. The actions of a supercell handover method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 630. The processor 620 reads information in the memory 630 and completes the actions of the method in combination with hardware. No more detailed descriptions will be made herein to avoid repetitions.

Alternatively, the processor 620 is configured to determine one or more second cells using the second frequency band to be (a) target cell(s) according to the first indication information.

The processor 620 is further configured to perform cell synchronization with the target cell(s).

The transceiver 610 is specifically configured to, when there is data to be transmitted, perform data transmission with the target cell(s) using the second frequency band.

Alternatively, the first indication information is paging information, or the first indication information is paging information and configuration information of the target cell(s) transmitted by a first base station through the first cell. The first indication information includes information of a second frequency band and/or information of a base station containing the target cell(s) and/or information of the target cell. The first base station is a base station containing the first cell.

The processor 620 is specifically configured to determine the target cell(s) according to the paging information.

Or, the processor 620 is specifically configured to determine the target cell(s) according to the paging information and the configuration information of the target cell(s).

Alternatively, the first indication information is system information of the second cell transmitted by the first base station through the first cell. The system information of the second cell includes information of the frequency band of the second cell and/or information of the base station containing the second cell and/or information of the second cell. The first base station is the base station containing the first cell.

The transceiver 610 is specifically configured to receive system information of at least one second cell in the first cell using the first frequency band. The system information of the at least one second cell correspond to the at least one second cell.

The processor 620 is specifically configured to determine one or more second cells from the at least one second cell to be (a) target cell(s) according to the system information of the at least one second cell.

Alternatively, the transceiver 610 is further configured to transmit an uplink synchronization request to a target base station containing the target cell(s) on the second frequency band. The uplink synchronization request is configured to obtain uplink synchronization information of the terminal and the target cell(s).

The transceiver 610 is further configured to receive the uplink synchronization information in the first cell. The uplink synchronization information is acquired by the first base station from the target base station, the uplink synchronization information is determined by the target base station on the basis of the uplink synchronization request, and the first base station is the base station containing the first cell.

The processor 620 is specifically configured to perform uplink synchronization with the target cell(s) according to the uplink synchronization information.

Alternatively, the transceiver 610 is further configured to receive downlink synchronization information of the first cell in the first cell.

The processor 620 is further configured to determine downlink synchronization information of the target cell(s).

The processor 620 is specifically configured to perform downlink synchronization with the target cell(s) according to the downlink synchronization information of the target cell(s).

Alternatively, the transceiver 610 is further configured to receive at least one downlink synchronization offset information transmitted by the first base station through the first cell and corresponding to the at least one second cell. Each downlink synchronization offset information includes a time offset between timing of the corresponding second cell and timing of the first cell, and the first base station is the base station containing the first cell.

The processor 620 is specifically configured to determine the downlink synchronization information of the target cell(s) according to the downlink synchronization offset information of the at least one second cell.

The terminal 600 according to the embodiment of the disclosure may correspond to the terminal in the data transmission method of the embodiments of the disclosure. Moreover, each module in the terminal 600 and the other abovementioned operations and/or functions are adopted to implement the corresponding flows of the method in FIG. 2 respectively and will not be elaborated herein for simplicity.

In such a manner, the terminal according to the embodiment of the disclosure completes synchronization with a target cell in advance on the first frequency band and, when there is data to be transmitted or received, performs data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with the prior art, the terminal according to the embodiment of the disclosure greatly reduces cell access process in the prior art and reduces a signaling overhead.

Figure 7:
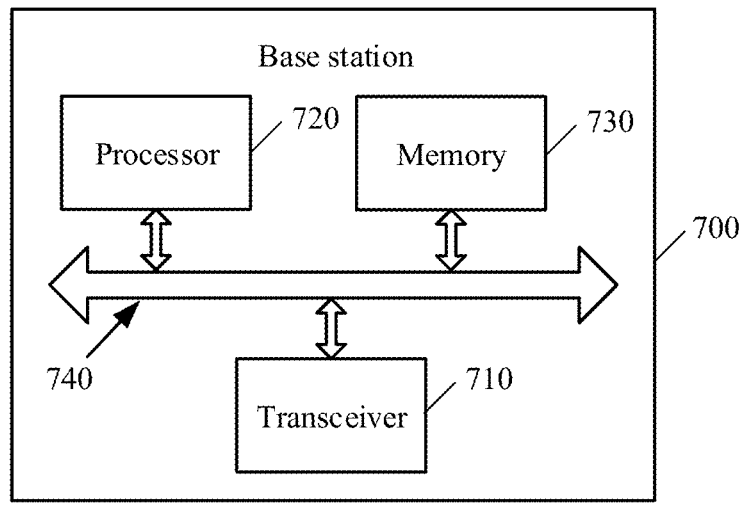
FIG. 7 illustrates another schematic block diagram of a base station according to an embodiment of the application.

FIG. 7 illustrates a schematic block diagram of a base station 700 according to an embodiment of the disclosure. As illustrated in FIG. 7, the base station 700 includes a transceiver 710, a processor 720, a memory 730 and a bus system 740. The processor 720, the memory 730 and the transceiver 710 are connected through the bus system 740. The memory 730 is configured to store instructions. The processor 720 is configured to execute the instructions stored in the memory 730 to control the transceiver 710 to transmit and receive information.

The processor 720 is configured to determine first indication information, the first indication information being configured to instruct a terminal receiving the first indication information to transmit data in a second cell using a second frequency band, and the base station is a base station containing a first cell using a first frequency band.

The transceiver 710 is configured to transmit the first indication information through the first cell.

Alternatively, the first indication information is paging information, or the first indication information is paging information and configuration information of a target cell. The first indication information includes information of a second frequency band and/or information of a base station containing the target cell(s) and/or information of the target cell. The second cell includes the target cell. A target base station is a base station containing the target cell.

The transceiver 710 is specifically configured to transmit the paging information through the first cell.

The transceiver 710 is specifically configured to transmit the paging information and the configuration information of the target cell through the first cell.

Alternatively, the first indication information is system information of the second cell. The system information of the second cell includes information of the frequency band of the second cell and/or information of the base station containing the second cell and/or information of the second cell.

The transceiver 710 is further configured to receive system information of at least one second cell transmitted by at least one second base station. The system information of the at least one second cell corresponds to the at least one second cell.

The transceiver 710 is specifically configured to transmit the system information of the at least one second cell through the first cell.

Alternatively, the transceiver 710 is further configured to transmit uplink synchronization information through the first cell. The uplink synchronization information is acquired by the base station from the target base station, and the uplink synchronization information is determined by the target base station on the basis of an uplink synchronization request transmitted to the target base station by the terminal on the second frequency band. The target base station is the base station containing the target cell. The target cell is determined by the terminal from the at least one second cell.

Alternatively, the transceiver 710 is further configured to transmit downlink synchronization information of the first cell to the terminal through the first cell.

Alternatively, the transceiver 710 is further configured to transmit at least one downlink synchronization offset information corresponding to the at least one second cell to the terminal through the first cell. Each downlink synchronization offset information includes a time offset between timing of the corresponding second cell and timing of the first cell.

The base station 700 according to the embodiment of the disclosure may correspond to the first base station in the data transmission method of the embodiments of the disclosure. Moreover, each module in the base station 700 and the other abovementioned operations and/or functions are adopted to implement the corresponding flows of the method in FIG. 2 respectively and will not be elaborated herein for simplicity.

In such a manner, the base station according to the embodiment of the disclosure transmits downlink control signaling to the terminal on the first frequency band, to enable the terminal to complete synchronization with a target cell in advance on the first frequency band and, when there is data to be transmitted, the terminal may perform data transmission with the target cell, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with the prior art, the base station according to the embodiment of the disclosure greatly reduces cell access process in the prior art and reduces a signaling overhead.

Figure 8:
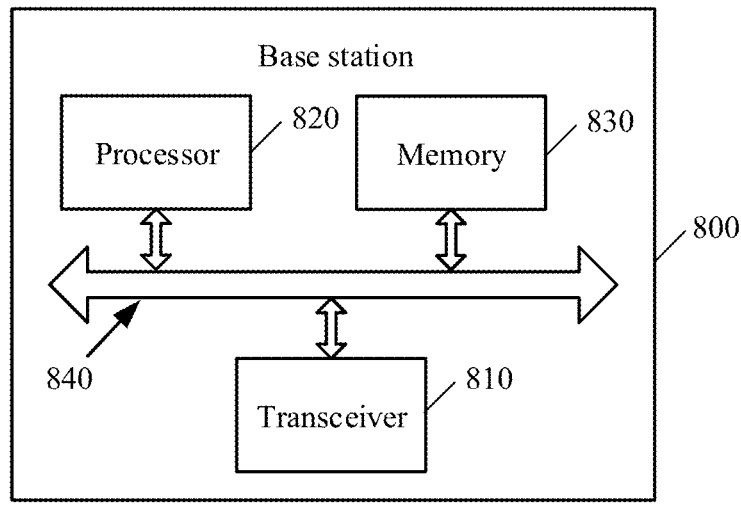
FIG. 8 illustrates another schematic block diagram of another base station according to an embodiment of the application.

FIG. 8 illustrates a schematic block diagram of another base station 800 according to another embodiment of the disclosure. As illustrated in FIG. 8, the base station 800 includes a transceiver 810, a processor 820, a memory 830 and a bus system 840. The processor 820, the memory 830 and the transceiver 810 are connected through the bus system 840. The memory 830 is configured to store instructions. The processor 820 is configured to execute the instructions stored in the memory 830 to control the transceiver 810 to transmit and receive information.

The transceiver 810 is configured to transmit system information of a second cell to a first base station. The system information is configured to indicate a system parameter of the second cell. A carrier frequency corresponding to the second cell belongs to a second frequency band, the first base station is a base station containing a first cell using a first frequency band, and the second base station pre-stores a mapping relationship between the second cell and the first cell.

The transceiver 810 is further configured to transmit data with a terminal through the second cell.

Alternatively, the transceiver 810 is further configured to receive an uplink synchronization request transmitted by the terminal on the second frequency band. The uplink synchronization request is configured to obtain uplink synchronization information between the terminal and the second cell.

The transceiver 810 is further configured to determine the uplink synchronization information according to the uplink synchronization request and transmit the uplink synchronization information to the first base station.

The base station 800 according to the embodiment of the disclosure may correspond to a second base station in the data transmission method of the embodiments of the disclosure. Moreover, each module in the base station 800 and the other abovementioned operations and/or functions are adopted to implement the corresponding flow of the method in FIG. 2 respectively and will not be elaborated herein for simplicity.

In such a manner, according to the base station of the embodiment of the disclosure, the terminal in the first cell completes synchronization with the target cell in advance and, when there is data to be transmitted, data transmission is performed with the terminal, so that relatively high power consumption probably brought by reception of downlink control signaling by the terminal camping on a high frequency band is avoided. Meanwhile, synchronization with the target cell is completed in advance to make it possible to implement data transmission with the target cell when there is data to be transmitted. Compared with the prior art, the base station according to the embodiment of the disclosure greatly reduces cell access process in the prior art and reduces a signaling overhead.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may be seen from the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the prior art or part of the technical solutions may be embodied in form of software product, and the computer software product is stored in a storage medium, including a plurality of instructions configured to enable a computer device (which may be a personal computer, a server, a network device or the like) to execute all or part of the actions of the method in each embodiment of the disclosure. The abovementioned storage medium includes: various media capable of storing program codes such as a U disk, a mobile hard disk, a Read-Only Memory (ROM), a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
when no data is to be transmitted or received, receiving, by the terminal, first indication information in a first cell using a first frequency band, the first indication information being configured to instruct the terminal receiving the first indication information to perform data transmission using a second frequency band when there is data to be transmitted or received; and when there is data to be transmitted or received, performing, by the terminal, data transmission in a second cell using the second frequency band according to the first indication information;
wherein when there is data to be transmitted or received, performing, by the terminal, data transmission in the second cell using the second frequency band according to the first indication information comprises:
determining, by the terminal, one or more second cells using the second frequency band to be a target cell according to the first indication information;
performing, by the terminal, synchronization with the target cell; and
when there is data to be transmitted or received, performing, by the terminal, data transmission with the target cell using the second frequency band;
wherein performing, by the terminal, synchronization with the target cell comprises:
transmitting, by the terminal, an uplink synchronization message to the target cell belonging to a target base station on the second frequency band, the uplink synchronization message being configured to obtain uplink synchronization information between the terminal and the target cell;
receiving, by the terminal, the uplink synchronization information, in the first cell, the uplink synchronization information being acquired by the first base station from the target base station, the uplink synchronization information being determined by the target base station on the basis of the uplink synchronization message, and the first base station being a base station containing the first cell; and
performing, by the terminal, uplink synchronization with the target cell according to the uplink synchronization information.

2. The method of claim 1, wherein the first indication information is paging information transmitted by a first base station through the first cell, or the first indication information is the paging information and configuration information of the target cell, the first indication information comprises at least one of the following information: information of a second frequency band, information of a base station containing the target cell, or information of the target cell, the first base station is a base station containing the first cell, and
wherein determining, by the terminal, the one or more second cells using the second frequency band to be the target cell according to the first indication information comprises:
determining, by the terminal, the target cell according to the paging information; or,
determining, by the terminal, the target cell according to the paging information and the configuration information of the target cell.

3. The method of claim 1, wherein the first indication information is system information of the second cell transmitted by the first base station through the first cell, the system information of the second cell comprises at least one of the following information: information of a frequency band of the second cell, information of a base station containing the second cell, or information of a second cell, and the first base station is a base station containing the first cell, and
wherein when no data is to be transmitted or received, receiving, by the terminal, the first indication information in the first cell using the first frequency band comprises:
receiving, by the terminal, system information of at least one second cell, in the first cell using the first frequency band, the system information of the at least one second cell corresponding to the at least one second cell one to one; and
wherein determining, by the terminal, the one or more second cells using the second frequency band to be the target cell according to the first indication information comprises:
determining, by the terminal, one or more second cells from the at least one second cell to be the target cell according to the system information of the at least one second cell.

4. The method of claim 1, wherein uplink synchronization information and a transmitting resource are determined by the target base station and transmitted to the terminal through the first base station; or
the uplink synchronization information is requested by the first base station from the target base station, and transmitted to the terminal by the first base station after the target base station obtains the uplink synchronization information and allocates the transmitting resource,
wherein the uplink synchronization information comprises indication information of the transmitting resource.

5. The method of claim 1, wherein performing, by the terminal, synchronization with the target cell comprises:
receiving, by the terminal, downlink synchronization information of the first cell in the first cell;
determining, by the terminal, downlink synchronization information of the target cell; and
performing, the terminal, downlink synchronization with the target cell according to the downlink synchronization information of the target cell.

6. The method of claim 5, wherein determining, by the terminal, the downlink synchronization information of the target cell comprises:
receiving, by the terminal, at least one downlink synchronization offset information transmitted by the first base station through the first cell and corresponding to the at least one second cell, each downlink synchronization offset information comprising a time offset between timing of the corresponding second cell and timing of the first cell, and the first base station being a base station containing the first cell; and
determining, by the terminal, the downlink synchronization information of the target cell according to the downlink synchronization offset information of the at least one second cell.

7. The method according to claim 1, wherein the terminal is kept synchronized with both the first cell and the target cell.

8. A data transmission method, comprising:
determining, by a first base station, first indication information, the first indication information being configured to instruct a terminal receiving the first indication information to transmit data in a second cell using a second frequency band, and the first base station being a base station containing a first cell using a first frequency band;
transmitting, by the first base station, the first indication information through the first cell; and
transmitting, by the first base station, uplink synchronization information through the first cell, the uplink synchronization information being acquired by the first base station from the target base station, and the uplink synchronization information being determined by the target base station on the basis of an uplink synchronization message transmitted by the terminal to the target base station on the second frequency band, wherein the target base station is a base station containing the target cell, and the target cell is determined by the terminal from the at least one second cell.

9. The method of claim 8, wherein the first indication information is paging information, or the first indication information is the paging information and configuration information of a target cell, the first indication information comprises at least one of the following information: information of a second frequency band, information of a target base station, or information of the target cell, the second cell comprises the target cell, and the target base station is a base station containing the target cell, and
wherein transmitting, by the first base station, the first indication information through the first cell comprises:
transmitting, by the first base station, the paging information through the first cell; or,
transmitting, by the first base station, the paging information and the configuration information of the target cell through the first cell.

10. The method of claim 8, wherein the first indication information is system information of the second cell, the system information of the second cell comprises at least one of the following information: information of a frequency band of the second cell, information of a base station containing the second cell, or information of the second cell, and
wherein transmitting, by the first base station, the first indication information through the first cell comprises:
receiving, by the first base station, system information of at least one second cell from at least one second base station, the system information of the at least one second cell corresponding to the at least one second cell; and
transmitting, by the first base station, the system information of the at least one second cell through the first cell.

11. The method of claim 8, further comprising:
transmitting, by the first base station, downlink synchronization information of the first cell to the terminal through the first cell.

12. The method of claim 11, further comprising:
transmitting, by the first base station, at least one downlink synchronization offset information corresponding to the at least one second cell to the terminal through the first cell, each downlink synchronization offset information comprising a time offset between timing of the corresponding second cell and timing of the first cell.

13. A terminal, comprising:
a processor; and
a memory storing instructions, which, when executed by the processor, cause the processor to execute one or more actions comprising:
when no data is to be transmitted or received, receiving first indication information in a first cell using a first frequency band, the first indication information being configured to instruct a terminal receiving the first indication information to perform data transmission using a second frequency band when there is data to be transmitted or received, wherein when there is data to be transmitted or received, performing data transmission in a second cell using the second frequency band according to the first indication information;
wherein the one or more actions further comprise:
determining one or more second cells using the second frequency band to be a target cell according to the first indication information; and
performing synchronization with the target cell, wherein when there is data to be transmitted or received, performing data transmission with the target cell using the second frequency band;
wherein performing synchronization with the target cell comprises:
transmitting an uplink synchronization message to a target base station containing the target cell on the second frequency band, the uplink synchronization message being configured to obtain uplink synchronization information between the terminal and the target cell;
receiving the uplink synchronization information in the first cell, the uplink synchronization information being acquired by the first base station from the target base station, the uplink synchronization information being determined by the target base station on the basis of the uplink synchronization request message, and the first base station being the base station containing the first cell; and
performing uplink synchronization with the target cell according to the uplink synchronization information.

14. The terminal of claim 13, wherein the first indication information is paging information transmitted by a first base station through the first cell, or the first indication information is the paging information and configuration information of the target cell, the first indication information comprises at least one of the following information: information of a second frequency band, information of a base station containing the target cell, or information of the target cell, the first base station is a base station containing the first cell, and
wherein determining the one or more second cells using the second frequency band to be the target cell according to the first indication information comprises:
determining the target cell according to the paging information; or,
determining the target cell according to the paging information and the configuration information of the target cell.

15. The terminal of claim 13, wherein the first indication information is system information of the second cell transmitted by the first base station through the first cell, the system information of the second cell comprises at least one of the following information: information of a frequency band of the second cell, information of a base station containing the second cell, or information of a second cell, and the first base station is a base station containing the first cell, and
wherein when no data is to be transmitted or received, receiving the first indication information in the first cell using the first frequency band comprises:
receiving system information of at least one second cell, in the first cell using the first frequency band, the system information of the at least one second cell corresponding to the at least one second cell; and
wherein determining the one or more second cells using the second frequency band to be the target cell according to the first indication information comprises:

determining one or more second cells from the at least one second cell to be the target cell according to the system information of the at least one second cell.

16. The terminal according to claim 13, wherein performing synchronization with the target cell comprises:
receiving downlink synchronization information of the first cell in the first cell;
determining downlink synchronization information of the target cell; and
performing downlink synchronization with the target cell according to the downlink synchronization information of the target cell,
wherein determining the downlink synchronization information of the target cell comprises:
receiving at least one downlink synchronization offset information transmitted by the first base station through the first cell and corresponding to the at least one second cell, each downlink synchronization offset information comprising a time offset between timing of the corresponding second cell and timing of the first cell, and the first base station being the base station containing the first cell; and
determining the downlink synchronization information of the target cell according to the downlink synchronization offset information of the at least one second cell.

17. The terminal according to claim 13, wherein the terminal is kept synchronized with both the first cell and the target cell.

* * * * *